United States Patent [19]
Frind

[11] Patent Number: 5,225,656
[45] Date of Patent: Jul. 6, 1993

[54] INJECTION TUBE FOR POWDER MELTING APPARATUS

[75] Inventor: Gerhard Frind, Altamont, N.Y.

[73] Assignee: General Electric Company, Schenectady, N.Y.

[21] Appl. No.: 540,974

[22] Filed: Jun. 20, 1990

[51] Int. Cl.$^5$ .............................................. B23K 9/00
[52] U.S. Cl. ........................... 219/121.47; 219/121.48; 219/121.5; 219/76.16
[58] Field of Search ............... 219/121.50, 121.47, 219/76.16, 76.15, 121.52, 121.36, 75, 121.48; 427/34

[56] References Cited

U.S. PATENT DOCUMENTS

| | | |
|---|---|---|
| 3,839,618 | 10/1974 | Muehlberger .................. 219/121.47 |
| 4,370,538 | 1/1983 | Browning ....................... 219/121.47 |
| 4,575,609 | 3/1986 | Fassel et al. ................... 315/111.51 |
| 4,766,287 | 8/1988 | Morrisioe et al. ............ 219/121.52 |
| 4,794,230 | 12/1988 | Seliskar et al. ................ 219/121.51 |
| 4,833,294 | 5/1989 | Montaser et al. ............. 219/121.52 |
| 4,902,870 | 2/1990 | Frind et al. .................... 219/121.47 |
| 4,916,273 | 4/1990 | Browning ....................... 219/121.47 |

Primary Examiner—Mark H. Paschall
Attorney, Agent, or Firm—James Magee, Jr.

[57] ABSTRACT

Apparatus and method for an RF plasma gun with injection probe that imparts feed material with a controllable radial component of motion by providing a conical exit port for the injection probe or a mesh screen therein.

2 Claims, 4 Drawing Sheets

INJECTION TUBE FOR POWDER MELTING APPARATUS

BACKGROUND OF THE INVENTION

This invention relates to streams of particles and to methods and apparatus for deflecting such particle beams. More particularly, the invention is directed to a particle injection technique for use in material deposition devices such as plasma and flame spray guns.

Various techniques and devices for spray deposition of ceramic and metal compositions are known. Radio frequency and direct current plasmas have been used to deposit coatings on substrates as well as to fabricate articles of specific shapes and dimensions. In general, a stream of particulate material, such as metal or ceramic powder, is directed into the hot zone of a flame or a plasma where the particles are melted. The molten droplets are then directed to a target such as a mold or a substrate where they coalesce and form a solid article or coating.

One technique for spray-forming employs an RF plasma gun to generate a high temperature gaseous plasma. For example, U.S. Pat. No. 4,805,833, the disclosure of which is incorporated herein by reference, describes an RF plasma apparatus including an RF plasma gun. The plasma is produced by induced RF energy which causes gases flowing in the interior of the gun to form a plasma plume or jet which is directed to an adjacent substrate. In RF plasma deposition, powder particles of a feed material, entrained in a carrier gas, are introduced into the plasma. The heat of the plasma is sufficiently high to cause melting of the particles as they move through the plasma and deposition of liquid droplets onto the surface of the substrate Particles injected into the center of the plasma drastically cool the small central plasma volume to which they are confined. This is shown theoretically in FIGS. 1 and 2. FIG. 1 shows the plasma temperature along the centerline as a function of axial distance at particle loadings of 0, 10, and 20 grams per minute. As the particle mass flow rate increases, cooling is increased. This cooling of the central portion of the plasma has an adverse effect on particle heating, thus limiting the maximum particle spray rate and also the melting temperatures of alloys which can be successfully sprayed. FIG. 2 shows the particle temperature as a function of loading rate. Plasma temperature and particle temperature are particularly important for spraying high temperature alloys which contain columbium,, molybdenum, or tungsten.

SUMMARY OF THE INVENTION

A spray deposition apparatus comprising a melting zone; means for injecting particulate feed material into the melting zone; a collector for receiving a deposit of coalesced feed material, said means for injecting, including a particle injector tube having an exit orifice at the exit end thereof formed by convergent inner bore which provides an exit orifice having a cross-section from about one tenth to about one quarter of the cross-section of the non-converging portion of the tube bore.

In its broader aspects, the invention contemplates spray deposition apparatus for meltable materials which includes a melting zone, such as a flame or plasma, and means for injecting a stream of meltable particles into the melting zone and then ejecting or spraying the molten particles from the melting zone onto a receiver or target, such as a mold or a substrate, to be coated.

The injecting means is generally a temperature stable, often water-cooled, tube in communication with a reservoir of powdered or particulate feed material and a carrier gas. The carrier gas entrains the particles and propels them into and out of the melting zone. In order to overcome the localized cooling effect of rapid introduction of particles into the melting zone, it is desirable to disperse the stream of feed material particles away from the central region of the zone which is generally aligned with the exit orifice of the injector tube. For this purpose, the nozzle end of the tube is designed to deflect or scatter the as yet unmelted particles into a pattern which diverges outwardly towards the periphery of the plasma plume or flame which forms the melting zone of the apparatus. A divergent pattern is imparted by providing the exit end of the tube with a conical configuration formed by a convergent inner bore having an exit orifice having a diameter which is less than the diameter of the non-converging portion of the tube. The convergent inner wall provides a defecting surface which a certain portion of the particles in the stream strike and reflect off, thereby acquiring a flight pattern which is divergent with respect to particles which pass through the orifice without deflection.

The proportion of particles in the feed stream which strike the converging walls of the conical bore is determined by the difference in the cross-section of the orifice and of the non-converging bore of the tube. In general, the ratio of circular area at the orifice and the area of a cross-section of the non-converging bore can range from about 1:10 to about 1:4. For example, if the area of the orifice is one half of the area of the non-converging bore, about one half of the particles in the feed stream will strike the conical wall and be deflected.

It will also be apparent that the degree of deflection or spread and, therefore the degree of divergence from the normal, will increase with the angle at which the conical inner wall converges, i.e., the angle shown as $\theta$ in the drawings. A larger $\theta$ for a given orifice area will provide a greater angle of divergence from the normal or undeflected flight path.

In accordance with the invention, the particles being injected are deflected and thereby provided with a selected radial component of motion, which will disperse them into a broader angle of flight as they enter the plasma chamber, and thus into a larger volume of the RF-plasma discharge. Dispersion of some of the particles into the outer region of the plasma reduces cooling of the central portion of the plasma thereby facilitating melting of the particles which are in the center of the plasma plume. Dispersion of the particles throughout a larger portion of the plasma volume permits use of higher particle loading or flow rates without undue cooling of the plasma. In addition, this technique has the important effect of bringing the particles into direct contact with a significantly larger plasma volume, which can heat the particles with a much smaller decrease in the temperature of the plasma. Combined, the two effects contribute to improvement in heating of the injected particles, operation of the plasma gun, and quality of the deposited coating.

In one embodiment of the invention, an RF plasma gun is provided comprising an enclosure defining a chamber in which the plasma is generated and having a plasma exit port through which the plasma flows, an electrical conductor adjacent the enclosure for applying RF energy to the ionizable plasma-forming gases region within the chamber, means for introducing the gas at selected locations of the chamber such that upon application of RF energy a plasma is formed, and means of supplying, to the plasma, particles of a feed material, such as a columbium alloy, a molybdenum alloy, a tungsten alloy, or a titanium alloy, wherein at least a portion of the particles will travel to the outer portions of the plasma with a radial component of motion. The means for supplying the particulate feed material is a cylindrical particle injection tube having a tapering conical exit orifice at one end of the tube which deflects the particles of feed material at the exit. The scattering effect of the deflecting nozzle disperses the particles outwardly away from the center of the plasma. Alternatively, the supply means may include a plurality of cross wires forming a mesh mounted at one end of the particle injection tube. Preferably, the area ratio of the conical nozzle exit to the cross-section of the regular bore of the particle injection tube is 1:4.

In another aspect of the invention, a radio frequency plasma spray method for depositing feed material onto a substrate comprises providing a radio frequency plasma gun, supplying to the interior of the gun ionizable gas for formation of a plasma, operating the apparatus to direct RF energy to the gas whereby the plasma is formed, and supplying particles of feed material to the plasma, at least a portion of the particles being scattered towards the outer region of the plasma.

DETAILED DESCRIPTION OF THE INVENTION

The use of the deflecting injector tube is described in the context of a RF plasma spray gun. It will be appreciated that this injector tube is useful with a variety of metal powder melt-spray devices.

Figure 1:
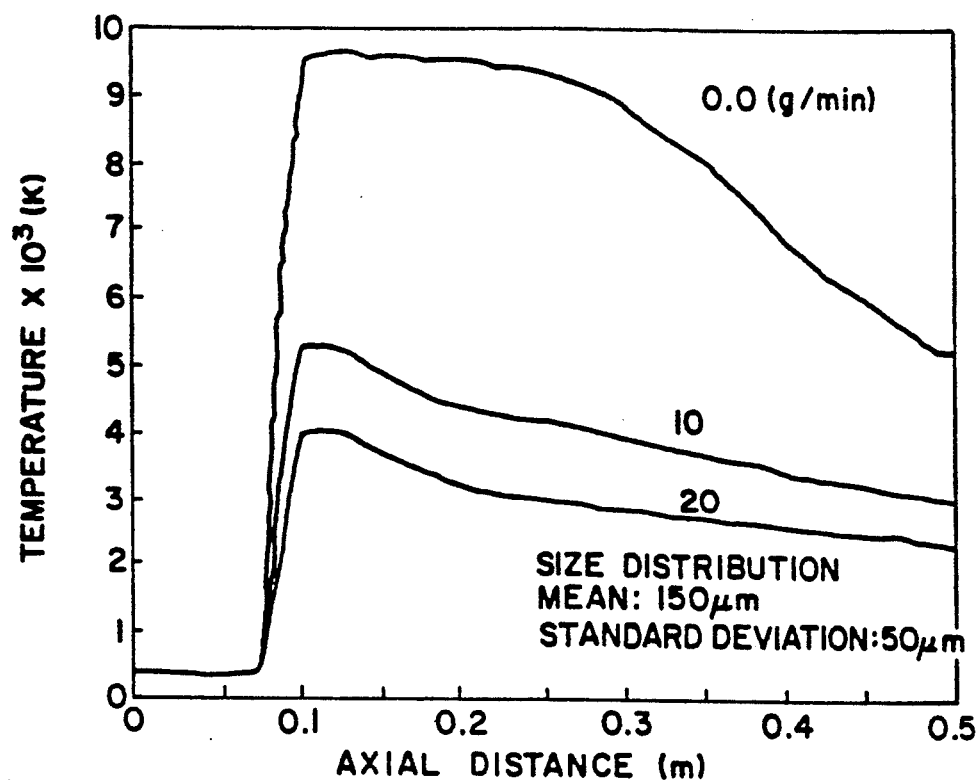
FIG. 1 is a graph showing theoretical plasma temperatures along the centerline of the plasma as a function of axial distance from the exit of the injection tube in an RF generated plasma operated at different particle loading rates.
Figure 2:
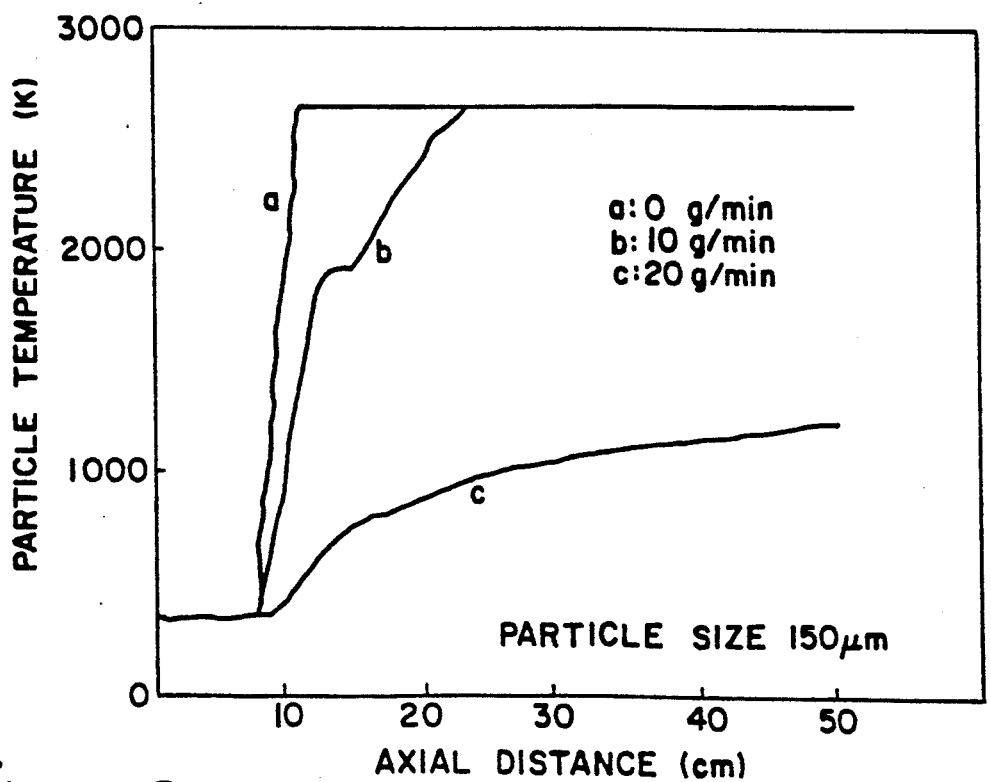
FIG. 2 is a graph showing the thermal history of 150 millimicron particles injected at the plasma centerline for various particle loading rates.
Figure 3:
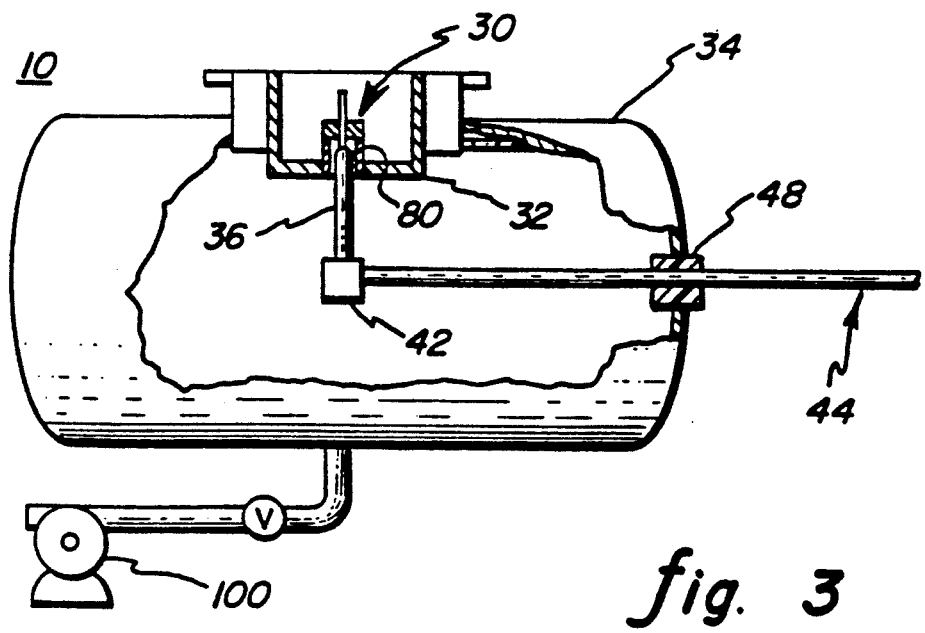
FIG. 3 is a schematic fragmented side view of an RF plasma deposition system.

In the RF plasma gun illustrated in FIG. 3, feed material, in particulate form, is injected axially into the plasma. It has been shown theoretically that this type of injection cools the small central plasma volume, especially for high particle mass flow rates, see FIGS. 1 and 2. This strong cooling effect of the central plasma section has an adverse effect on particle heating, thus limiting the maximum particle spray rate and also the highest melting temperatures of alloys which can be successfully sprayed. When the feed material is injected into the plasma with a radial component of motion, as disclosed herein, the feed stream will be dispersed as the particles exit the injection tube and a portion of the feed material will be directed into the hotter off-axis sections of the plasma, thus reducing heat extraction from the center of the plasma.

FIG. 3 illustrates a suitable arrangement of an RF plasma deposition system, such as an RF spray apparatus for providing a surface coating on a target. The apparatus 10 comprises an RF generating means 30 secured to a support 32 which is shown in the form of a cylindrical chamber. The device 30 is secured to the support 32 centrally within the chamber. Support 32 is secured to a cylindrical metal tank 34 and projects somewhat into the interior of tank 34. The support 32 is an annular structure and may be electrically conductively connected to the tank 34 throughout its annular region. The RF plasma device 30 positioned in the support 32 generates a plasma 36 which is injected into the tank 34. The tank is evacuated as in a conventional RF plasma system, e.g., to about 250 torr, by pump 100.

The plasma 36 heats or otherwise treats the surface of a target or substrate 42 within the tank interior. The target 42 is carried by a mechanical actuator or mandrel 44 connected to a manipulating mechanism 46. The mandrel 44 enables the target 42 to be positioned and rotated relative to the plasma 36. In RF spray coating systems, feed material in particulate form, such as a superalloy, is injected into the plasma stream, melted by the plasma and sprayed by the plasma onto the target as liquid droplets.

Figure 4:
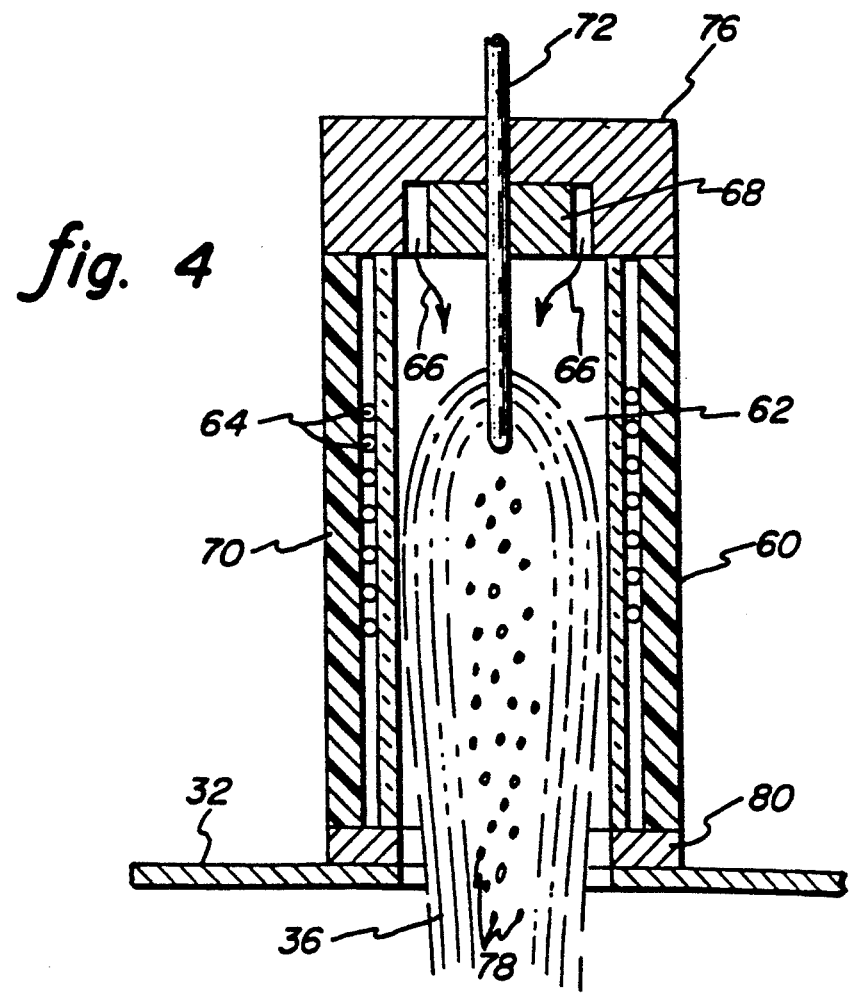
FIG. 4 is a more detailed sectional view of the plasma gun of FIG. 3.

The RF plasma device 30 is illustrated in more detail in FIG. 4 and comprises an electrically insulative dielectric enclosure 60, which typically may be made of quartz forming a cylindrical chamber 62 for the plasma. An electrical induction coil 64 is connected to a source of RF energy (not shown) and surrounds the enclosure 60 for coupling RF energy to an ionizable gas, such as argon, hydrogen, nitrogen, or helium which is injected into the chamber to produce the plasma. The gas flows in the direction of arrows 66 preferably in a downwardly swirling path. An annular ring 68 includes passageways (not shown) in which the ionizable gas mixture enters the plasma chamber 62. The gas streams illustrated by arrows 66 may be injected into the chamber 62 both axially and tangentially. A second tubular insulating member 70, which may be made of an insulating material such as tetrafluoroethylene is disposed about the coil 64 and enclosure 60. The coil 64, enclosure 60 and the second tubular insulating member 70 are concentric.

A water cooled particle injection tube 72 extends axially into the plasma chamber 62 through top member 76 and the gas injection ring 68. The particle injection tube 72 injects feed material in particulate form 78 into the plasma 36 with a controllable radial component of motion. The tubular enclosures 60 and 70 are secured to member 74.

Annular ring 80 at the exit end of the spray gun may be provided for holding the structure together and for mounting the gun on support 32.

Figure 5:
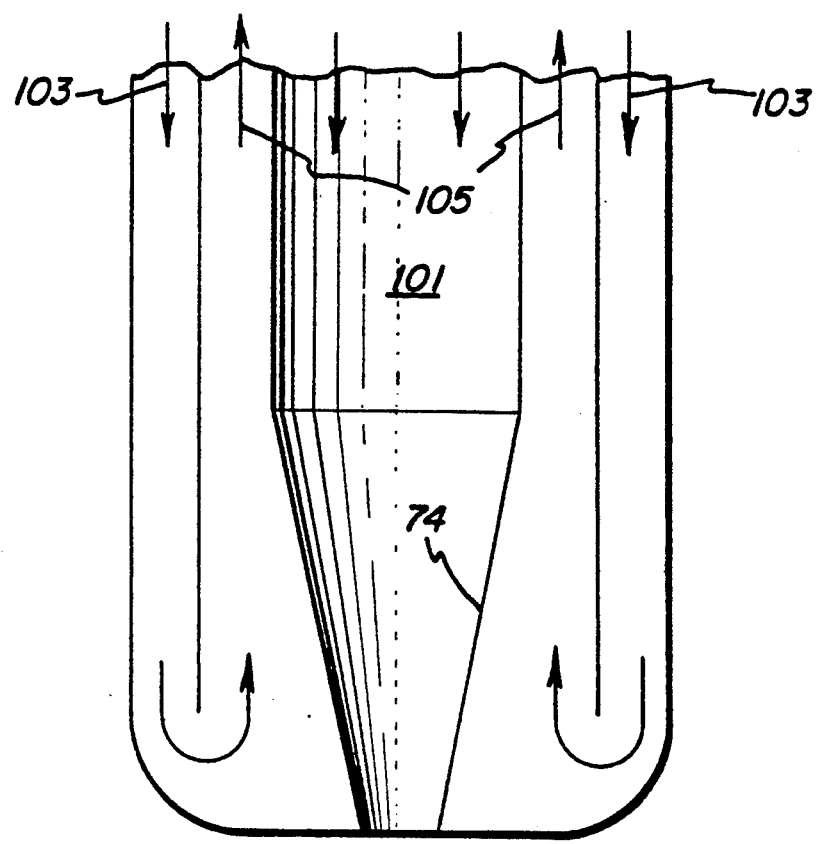
FIGS. 5 and 5A are schematic illustrations of an exit nozzle of the particle injector for imparting a scattering effect or radial component of motion to the feed material.
Figure 6:
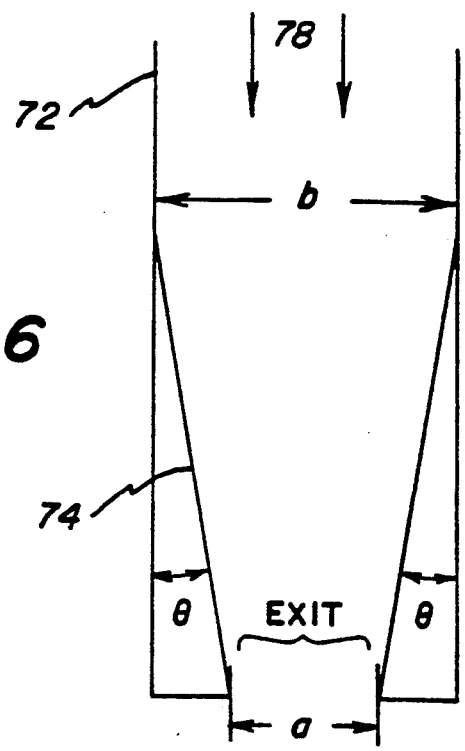
FIGS. 6 and 7 are schematic illustrations of various configurations for the nozzle in FIG. 5.

One embodiment of a means for deflecting the feed material to impart a radial component of motion is by providing a conical nozzle 74 to the exit of the cylindrical particle injection tube 72 as shown in FIGS. 5 and 6. A number of the particles moving axially in the tube 72 will impact on the conical walls, reflect and thus acquire the desired radial component of motion.

Figure 5A:
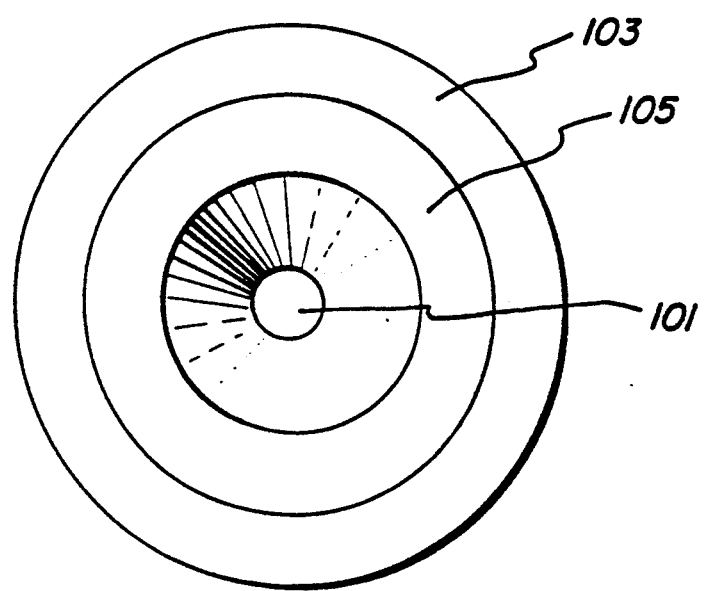

FIGS. 5 and 5A show an embodiment of the exit end of tube 72 which includes a central conduit 101 for the feed material and its carrier gas and coolant circuit in which the direction of flow is indicated by arrows 103 and 105. The conical deflection portion of the orifice end of conduit 101 is shown at 74.

Figure 7:
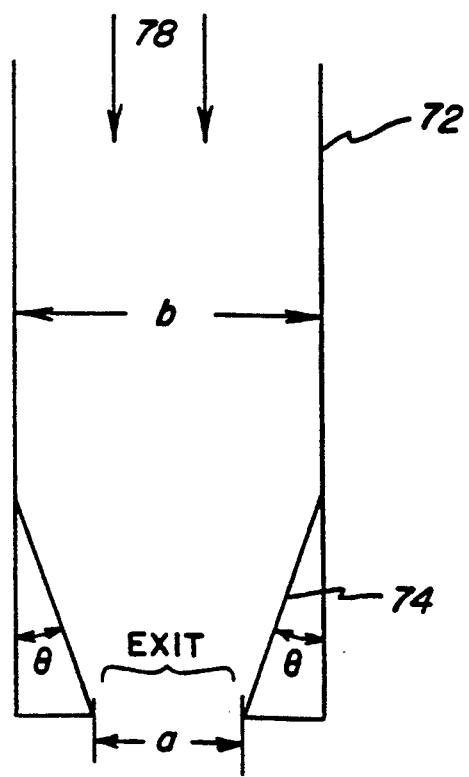

The relative number of particles which are deflected towards the outer region of the plasma can be varied by the angle of inclination of the conical wall portion at the exit end of the feed tube. FIGS. 6 and 7 illustrate two configurations having a relatively small and relatively large angle, respectively, the exit aperture (a) remaining the same. In FIG. 6, the angle $\theta$ provides a relatively low angle of deflection of the particles passing through the tube. In contrast, the larger angle of FIG. 7 will provide a greater degree of deflection for the particles.

In general, the ratio (a:b) of the area of the exit aperture (a) to the cross section area of the tube above the cone (b) can be varied or kept constant as the angle of inclination is changed.

Another embodiment of a means for deflecting the feed material includes a fine wire mesh positioned near the exit end of the particle injection tube. A number of particles will impact on the mesh and be deflected thus acquiring the desired radial component of motion.

What is claimed is:

1. A high pressure RF plasma gun comprising:

(a) an enclosure defining a chamber for containing a plasma and having a plasma exit port through which the plasma flows,
   (b) an electrical conductor adjacent the enclosure for applying RF energy to a region within the chamber to create the plasma from a fuel gas flowing in the chamber,
   (c) means for introducing fuel gas at selected locations of the chamber such that upon application of RF energy a plasma is formed, and
   (d) water cooled injector means for supplying particles of a feed material to the plasma whereby at least a portion of the particles will travel to the outer portions of the plasma with a radial component of motion comprising an injector tube having a bore with a convergent nozzle portion defining an exit orifice having a cross section of about one tenth to about one quarter of the cross section of the nonconvergent portion of the bore of the tube.

2. A powder melting apparatus comprising a melting zone; an injector tube for injecting meltable particulate feed material into the melting zone, said injector tube having a bore with a convergent nozzle portion characterized by an exit orifice having a cross section of about one-tenth to one-quarter of the cross section of the nonconvergent portion of the injector tube bore.

* * * * *